United States Patent
Sato et al.

(10) Patent No.: US 6,621,033 B2
(45) Date of Patent: Sep. 16, 2003

(54) ELECTRICAL DISCHARGE MACHINING APPARATUS

(75) Inventors: Tatsushi Sato, Tokyo (JP); Yoshihito Imai, Tokyo (JP); Hidetaka Miyake, Tokyo (JP); Takayuki Nakagawa, Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/773,559

(22) Filed: Feb. 2, 2001

(65) Prior Publication Data

US 2001/0050270 A1 Dec. 13, 2001

(30) Foreign Application Priority Data

Jun. 12, 2000 (JP) .......................................... 2000-175081

(51) Int. Cl.$^7$ ................................................. B23H 1/04
(52) U.S. Cl. ................................. 219/69.15; 219/69.11; 219/69.14; 428/567; 29/877
(58) Field of Search ............................ 219/69.15, 69.11, 219/69.14; 29/877, 876; 428/567

(56) References Cited

U.S. PATENT DOCUMENTS 4,797,527 A * 1/1989 Yamamoto et al. ........ 219/69 E
5,837,957 A * 11/1998 Sato et al. ................. 219/69.15

FOREIGN PATENT DOCUMENTS

| JP | 58-186532 | 10/1983 |
| JP | 61-71920 | 4/1986 |
| JP | 62-84920 | 4/1987 |

OTHER PUBLICATIONS

Mohri et al., "Finishing On The Large Area Of Work Surface By EDM", Journal of Japanese Society for Precision Engineering, vol. 53, No. 1, 1983, pp. 124–130 no translation.

* cited by examiner

Primary Examiner—M. Alexandra Elve
(74) Attorney, Agent, or Firm—Leydig, Voit & Mayer, Ltd.

(57) ABSTRACT

A layered anisotropically conductive element, a resistant element, and a feed element constitute an electrode for discharge machining. The layered anisotropically conductive element includes high conductivity layers and low conductivity layers alternately laminated on each other, the high conductivity layers and the low conductivity layers being made of thin metallic plates coated with an insulating film. The layered anisotropically conductive element has an anisotropic conductivity, in which the conductivity in a direction parallel to the low conductivity layers is much higher than that in a direction perpendicular to the low conductivity layers. The resistant element is connected to one of end surfaces of the layered anisotropically conductive element perpendicular to the layers. The feed element is connected to the resistant element.

15 Claims, 5 Drawing Sheets

ELECTRICAL DISCHARGE MACHINING APPARATUS

BACKGROUND OF THE INVENTION

1. Field of the Invention

The present invention relates to electrical discharge machining apparatuses. In particular, the present invention relates to an electrical discharge machining apparatus which is preferably used for machining which requires very low roughness, such as precision machining using an electrical discharge.

2. Description of the Related Art

As a method for increasing working speed in electrical discharge machining, a method in which a plurality of discharges are simultaneously generated (hereinafter referred to as "parallel discharge") is known. The method for producing the parallel discharge was initially used for preventing the surface smoothness in a large finishing-working region from deteriorating.

A method is disclosed in, for example, Japanese Unexamined Patent Application Publication No. 61-71920 for improving the surface smoothness in a large finishing-working region by using electrodes with electrically resistant surfaces (hereinafter referred to as a "resistant electrode method").

FIG. 11 shows an electrode to be used in the resistant electrode method. The electrode shown in FIG. 11 includes a resistant element 1 made of a thin silicon plate having a thickness of 1.5 mm and a copper feed element 2 bonded to the resistant element 1 with a conductive adhesive.

The principle of the resistant electrode method is that stray capacitance formed in a gap between the electrode and a work (hereinafter referred to as a "working gap") is divided into a distributed parameter state by the resistance of the resistant element 1 provided at the end of the electrode, thereby reducing the amount of energy applied by the stray capacitance to the discharged area to the same amount of the energy applied when machining a small area, and thereby preventing the surface smoothness in a large machining region from deteriorating. The above-described disclosure refers to the fact that a plurality of discharges (parallel discharge) are generated due to a slight potential gradient produced in the electrode when a resistant element is provided at the surface of the electrode. However, in the resistant electrode method, a problem occurs, which is described below.

Resistant electrode methods similar to the method described above are disclosed in, for example, Japanese Unexamined Patent Application Publication Nos. 58-186532 and 62-84920, in which an electrode is divided into a plurality of columnar electrodes, thereby improving the smoothness of the machining surface of a large finishing-working region (hereinafter referred to as a "divided electrode method").

FIG. 12 shows an electrode to be used in the divided electrode method. FIG. 13 is a perspective view of the entire configuration of the electrode to be used in the divided electrode method. The same or similar components shown in FIG. 11 are referred to with the same reference numerals and a description of those components is omitted. In FIGS. 12 and 13, insulative elements 3 and columnar members 4 made of a low-resistance material, such as copper, are shown.

The principle of the divided electrode method is that a plurality of the columnar members 4 are isolated from each other by the insulative elements 3 and are connected to the feed element 2 via the resistant element 1, as shown in FIG. 12, forming an electrode having the divided columnar electrodes in a bunched fashion, as shown in FIG. 13, thereby reducing the stray capacitance formed at the working gap to the level of stray capacitance formed when machining a small working area, and thereby preventing the machining-surface smoothness when working a large area from deteriorating. In the above-described disclosure of the divided electrode method, a parallel discharge is not referred to.

The parallel discharge is briefly mentioned in the Journal of The Japan Society for Precision Engineering, Vol. 53, No. 1, PP 124–130 in a description for the resistant electrode method, and not at all in the description for the divided electrode method. The parallel discharge referred to has the problem described below.

As described above, the countermeasure to overcome the problem of the surface-smoothness being deteriorated in finishing machining of a large area, which is adopted in the resistant electrode method, is to divide the stray capacitance produced at the working gap into smaller capacitances, thereby obtaining the same level of finishing-machining surface smoothness as that when machining a small area. That is, stray capacitance, which contributes to machining during discharging, is only produced in the vicinity of the region in which the discharge is generated (i.e., in a circle having a radius of several hundred microns), thereby suppressing the effect of the stray capacitance formed in the working gap, which causes a problem in the finishing machining of a large area.

In this case, the portion machined by the stray capacitance formed at the working gap is negligibly small, so that all the energy for machining can be considered to be supplied by a working current source in a pulsed manner. Therefore, it is considered that the energy to be supplied for working is substantially constant whether the parallel discharge is generated or not. The parallel discharge is generated at a plurality of discharge spots which are paths of flowing current divided from the working current supplied from the working current source. Therefore, the problem is that the discharge-machining speed is not increased by the parallel discharge.

Another problem is that the parallel discharge cannot be generated practically in the divided electrode method. This is because, in discharge machining, once discharge starts, subsequent discharges are continuously generated in the vicinity of the previous discharge because the distance between poles in which the discharge can be generated increases as the concentration of machined particles increases. It is considered that in a divided electrode including bundled columnar members forming, for example, a 10-mm square, as described in the above document, the discharges are generated continuously at the particular columnar member at which the initial discharge was generated. It is assumed that the reason why the parallel discharge in the divided electrode method is not described in the above document is because of this problem.

Another problem in the divided electrode method is that the structure of the electrode is complex.

SUMMARY OF THE INVENTION

Accordingly, it is a first object of the present invention to provide an electrical discharge machining apparatus in which the discharge machining speed can be increased.

It is a second object of the present invention to provide an electrical discharge machining apparatus in which parallel discharge is always generated and the configuration of the electrodes is simplified.

To these ends, according to an aspect of the present invention, an electrical discharge machining apparatus includes a discharge-machining electrode opposing a work across a working gap. The discharge-machining electrode includes a layered anisotropically conductive element including conductive layers and low-conductive layers alternately laminated on each other, a resistant element connected to one of layer-perpendicular end surfaces of the layered anisotropically conductive element, and a feed element connected to the resistant element. With this arrangement, the area of each conductive layer as a capacitor opposing the work can be increased, although the conductive layer is thin, by extending along the work surface. The capacitance formed in a working gap between the conductive layers and the work equals the sum of the small capacitors connected in parallel to each other through resistors. Each capacitor having a capacitance sufficient for discharge machining is disposed at a distance sufficiently close to the others for generating a parallel discharge, whereby machining can be performed by simultaneous and parallel electrical discharges, thereby increasing the discharge machining speed by using an electrode having a simple structure.

According to another aspect of the present invention, an electrical discharge machining apparatus comprises a discharge-machining electrode opposing a work across a working gap. The discharge-machining electrode includes a layered anisotropically conductive element including conductive layers and low-conductive layers alternately laminated on each other, a resistant element connected to one of layer-perpendicular end surfaces of the layered anisotropically conductive element, a feed element connected to the resistant element, and a conductive grounding element provided via a dielectric element on any one of the layer-perpendicular end surfaces of the layered anisotropically conductive element. The conductive grounding element is connected to the work. With this arrangement, the capacitance formed in a working gap between the discharge-machining electrode and the work can be further increased. Therefore, a simultaneous and parallel discharge can be generated more positively, and the discharge-machining speed can be further increased by using the discharge-machining electrode having a simple structure.

According to still another aspect of the present invention, an electrical discharge machining apparatus comprises a discharge-machining electrode opposing a work across a working gap. The discharge-machining electrode includes a layered anisotropically conductive element including conductive layers and low-conductive layers alternately laminated on each other, a resistant element connected to one of layer-perpendicular end surfaces of the layered anisotropically conductive element, and a feed element connected to the resistant element. The feed element includes at least two feed devices connected to the resistant element at positions thereof separated from each other in a direction parallel to the layer faces of the layered anisotropically conductive element, in a manner such that the difference in or the ratio of the opposing areas of the conductive layers of the layered anisotropically conductive element and the feed element between the feed devices differs depending on the individual conductive layers. The feed element includes current determining units for measuring electric current fed to the individual feed devices. With this arrangement, determination can be performed whether or not the charging current is concentrated to a specific capacitor, thereby preventing the machining surface of the work from being damaged.

The foregoing and other objects, features, aspects and advantages of the present invention will become more apparent from the following detailed description of the present invention when taken in conjunction with the accompanying drawings.

DESCRIPTION OF THE PREFERRED EMBODIMENTS

First Preferred Embodiment

Figure 1:
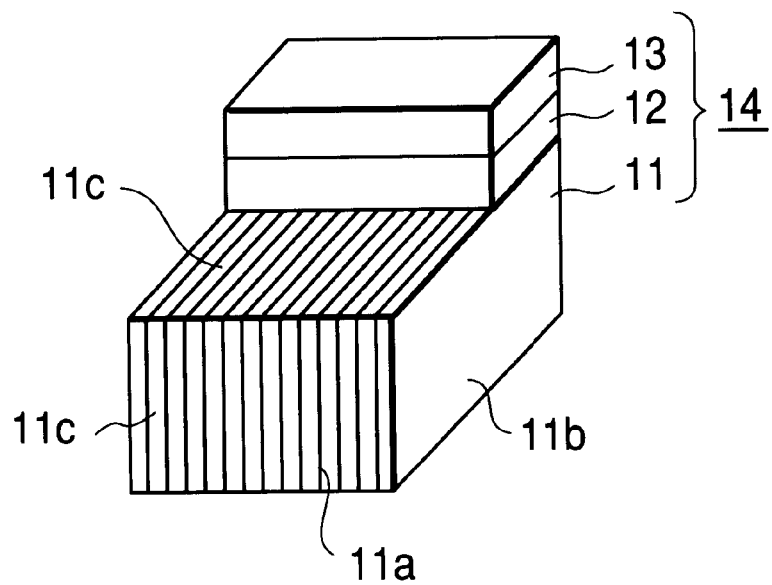
FIG. 1 is a perspective view of an electrode used in an electrical discharge machining apparatus according to a first embodiment of the present invention.
Figure 2:
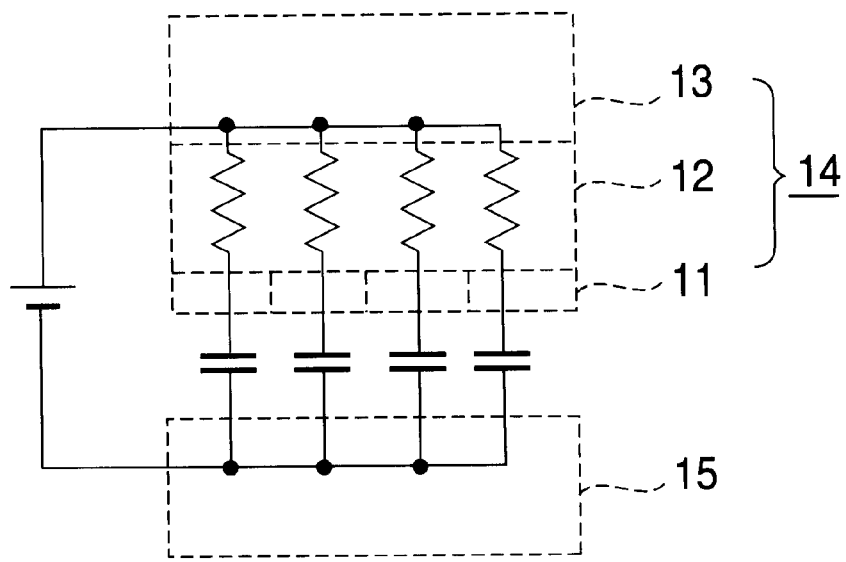
FIG. 2 is an equivalent circuit diagram of the principle of the discharge in the electrical discharge machining apparatus shown in FIG. 1.
Figure 3:
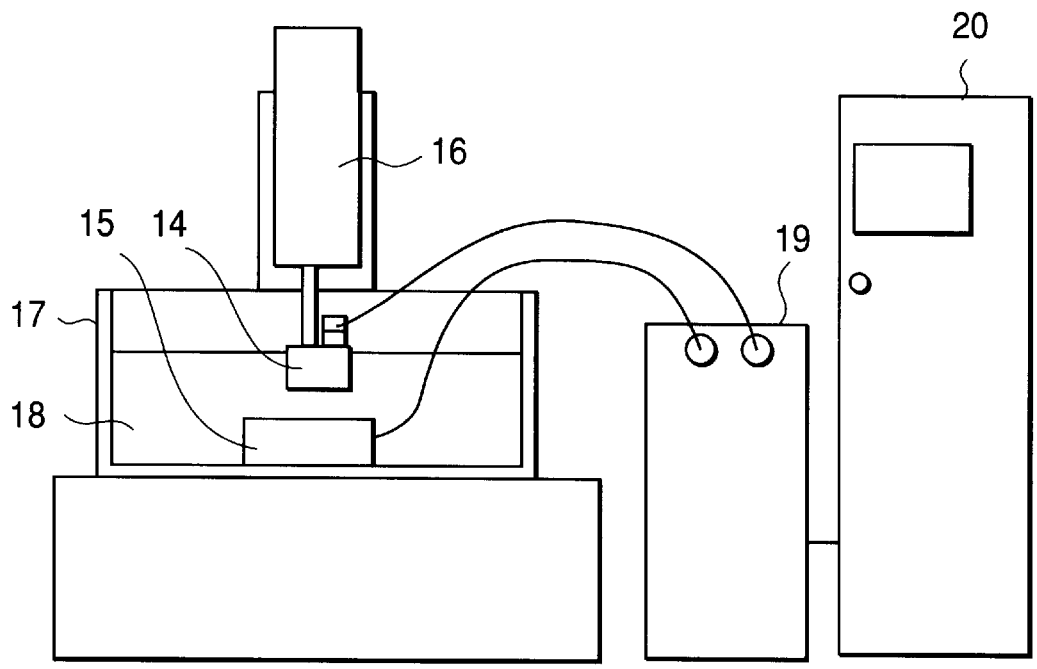
FIG. 3 is an illustration showing the configuration of the electrical discharge machining apparatus including the electrode shown in FIG. 1.

FIG. 1 is a perspective view of an electrode to be used in an electrical discharge machining apparatus according to a first embodiment of the present invention. FIG. 2 is an equivalent circuit diagram of the principle of discharge in the electrical discharge machining apparatus shown in FIG. 1. FIG. 3 is an illustration of the electrical discharge machining apparatus including the electrode for discharge machining shown in FIG. 1. An electrode 14 shown in FIG. 1 is configured with a layered anisotropically conductive element 11, a resistant element 12, and a feed element 13. The layered anisotropically conductive element 11 is made of metallic thin plates, for example, of copper coated with an insulative film, for example, a film of an alumina ceramic or enamel, and laminated on and bonded to each other. The layered anisotropically conductive element 11 includes high-conductive layers and low-conductive layers alternately laminated. The layered anisotropically conductive element 11 has anisotropic conductivity in which the conductivity in a direction parallel to the low-conductive layers is significantly higher than that in a direction perpendicular to the low-conductive layers.

The layered anisotropically conductive element 11 shown in FIG. 1 includes a layer face 11a which is a surface of each of the conductive layers and the low-conductive layers, layer-parallel end-faces 11b which are end surfaces extending parallel to the layer faces 11a, and layer-perpendicular end-faces 11c which are end surfaces extending in a direction perpendicular to the layer faces 11a. In order to distinguish the layer-perpendicular end-faces 11c from the layer-parallel end faces 11b, the edges of the layer faces 11a are drawn in the layer-perpendicular end-faces 11c shown in FIG. 1.

When manufacturing the layered anisotropically conductive element 11, a metallic thin plate coated with an insulative film is supplied to a rapid prototyping apparatus using a method in which a material having a shape of, for example, a thin sheet is cut into a plurality of thin plates and the plates are laminated, so that electrodes having a desired shape can be manufactured directly from three-dimensional CAD data. The thickness of each conductive layer is preferably not greater than 1 mm, and is optimally not greater than 100 $\mu$m. The thickness of each low-conductive layer must be as thin as possible, and is preferably the same as or less than that of the conductive layer.

The resistant element 12 is made of an electrically resistant material such as carbon or a nickel-chrome alloy, and is connected to one of the layer-perpendicular end-faces 11c. For example, a thin electrically resistant plate is bonded to the layered anisotropically conductive element 11 at one of the layer-perpendicular end-faces 11c, or an electrically resistant film is deposited on the layer-perpendicular end-face 11c by a vacuum process.

The feed element 13 is made of a conductive material such as copper and is connected to the resistant element 12. The feed element 13 is connected to the resistant element 12 by bonding or by deposition in the same manner as the resistant element 12.

With this arrangement, each of the conductive layers included in the layered anisotropically conductive element 11 is connected to the feed element 13 via the resistant element 12. The preferable value of electrical resistance between the feed element 13 and the conductive layers varies, in accordance with various factors, in a range from 10Ω to 10 kΩ.

The characteristics of the electrode 14 having the configuration described above are described with reference to FIG. 2. As described above, in discharge machining, an electrode and a work oppose each other across a small gap (working gap), whereby stray capacitance is formed at the working gap. In the electrode 14, capacitors are formed by the conductive layers in the layered anisotropically conductive element 11 connected in parallel to each other via resistors in the resistant element 12, as shown in the equivalent circuit in FIG. 2.

When a voltage is applied between the electrode 14 and a work 15, each capacitor is charged, then discharge is generated at the working gap. The capacitors are connected in parallel to each other via resistors, whereby the voltage value between terminals of each capacitor differs from that in the other capacitors. That is, when a certain capacitor discharges, the voltage between terminals of other capacitors sufficiently separated from that capacitor does not change, thereby generating a parallel discharge.

Figure 11:
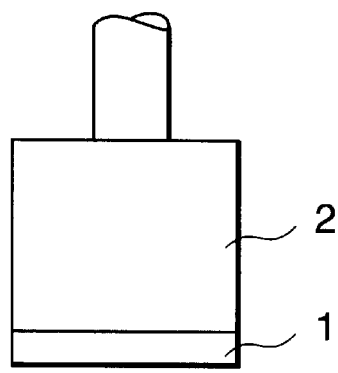
FIG. 11 is an illustration of an electrode used in a known resistant electrode method.

The method used in the electrical discharge machining apparatus according to the first embodiment of the present invention differs from the known resistant electrode method in the aspects described below. As shown in FIG. 11, in the known resistant electrode method, the resistant element 1 of a thin silicon plate and the feed element 2 of copper bonded to each other by a conductive adhesive constitute an electrode, and the stray capacitance formed at the working gap between the electrode and a work is divided by resistance. That is, the stray capacitance, which contributes to machining during discharging, is only produced in the vicinity of the region in which the initial discharge was generated (i.e., in a circle having a radius of several hundred microns), thereby reducing the effect of the stray capacitance formed at the working gap, which caused a problem in the finishing machining of a large area.

In this case, the portion machined by the stray capacitance formed at the working gap is negligibly small, so that all the energy for machining can be considered to be supplied by a working current source in a pulsed manner. Therefore, it is considered that the energy supplied for machining is substantially constant whether the parallel discharge is generated or not. The parallel discharge is generated at a plurality of discharge spots which are paths flowing divided from the working current supplied from the working current source. Therefore, the problem is that the discharge-machining speed is not increased by the parallel discharge.

According to the present invention, the electrode 14 is provided, which includes the layered anisotropically conductive element 11 having conductive layers and low-conductive layers laminated on each other, the resistant element 12 connected to one of the layer-perpendicular end-faces 11c of the layered anisotropically conductive element 11, and the conductive feed element 13 connected to the resistant element 12. Since the electrical resistance between any two points on the same conductive layer is substantially zero, each conductive layer can be considered as a capacitor, that is, a region can be considered as a capacitor as long as the region is disposed on the same conductive layer without depending on the distance from the region at which the discharge is generated. The fact in that each conductive layer serves as a capacitor is an aspect which greatly differs from that of the resistant electrode method. Each conductive layer, although thin, extends sufficiently long opposing the work 15 so that the area thereof opposing the work 15 can be increased compared with the electrode used in the resistant electrode method. Therefore, the capacitance is increased so that the effect thereof formed in the conductive layers on the machining is not negligible.

In the resistant electrode method, the stray capacitance formed at the working gap between the electrode and the work 15 must be eliminated, and the machining is performed mainly by the pulsed current supplied by a working current source. However, the electrical discharge machining apparatus according to the present invention positively uses the stray capacitance. The current supplied from a working current source is stored in each of the capacitors formed by the stray capacitance, then, is supplied for machining, whereby a parallel discharge by the capacitors formed with the conductive layers is made possible, thereby increasing the speed of the electrical discharge machining by using the electrode 14 having a simple structure. The current supplied by a working current source and used in the electrical discharge machining apparatus according to the present invention is not necessarily in a pulsed form because it is not used directly for discharging, as in the resistant electrode method. It may be supplied in any waveform such as a constant current waveform.

Figure 12:
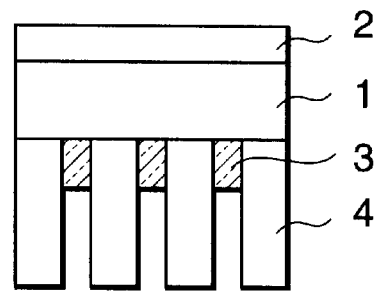
FIG. 12 is an illustration of an electrode used in a known divided electrode method.
Figure 13:
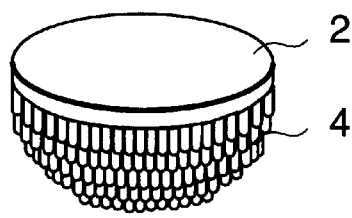
FIG. 13 is a perspective view of the entire electrode used in the known divided electrode method.

The method used in the electrical discharge machining apparatus according to the first embodiment of the present invention differs from the known divided electrode method in the aspects described below. In the divided electrode method, a plurality of the columnar members 4 are isolated from each other by the insulative elements 3 and are connected to the feed element 2 via the resistant element 1, as shown in FIG. 12, thereby constituting an electrode with bundled columnar electrodes shown in FIG. 13, and thereby reducing the stray capacitance formed at the working gap by dividing the stray capacitance into smaller capacitances of the same level as formed during machining of a small area. However, once electrical discharge is generated in discharge machining, as described above, the subsequent electrical discharges tend to be generated continuously in the vicinity of the initial discharge. Therefore, the columnar members 4 must be disposed sufficiently close to each other, for example, at a distance of several hundred microns, in order to generate the parallel discharge. However, the area of the work opposing the columnar members of the electrode becomes small because each of the columnar members must be made thin so as to be disposed close to each other, and accordingly, the stray capacitance formed by the columnar members becomes small. Therefore, the electrical charge stored in the stray capacitance does not significantly contribute to machining.

The area of each columnar member 4 must be sufficiently large, for example, 1 mm² or more, so as to charge a stray capacitance formed by opposing the work 15. On the other hand, the area of each columnar member 4 must be sufficiently small so that the distance of the center thereof from that of the adjacent columnar member is, for example, several hundred microns or less, so as to produce a parallel discharge. The two conditions are not compatible with each other. Therefore, in the divided electrode method which uses columnar members, each having a section of several square millimeters, which is the minimum size practically produceable, a parallel discharge seldom or never occurs because discharges are continuously generated at the columnar member at which the initial discharge occurred.

In contrast, according to the present invention, each conductive layer is thin and long; therefore, the conductive layer can oppose the work 15 with a sufficiently wide area for forming a capacitance large enough to contribute to machining, and at the same time, can be disposed sufficiently close to the others so that a parallel discharge can be generated. An area of 1 mm² or greater for the conductive layer opposing the work 15 is made possible by the conductive layer disposed at a distance of several hundred microns from the others and extending for several millimeters. According to the present invention, capacitors having a large capacitance can be disposed close to each other, whereby machining by a parallel discharge can be realized rather than generating continuous electrical discharges practically at one capacitor, as in the divided electrode method. Therefore, the speed of electrical discharge machining can be increased by using the electrode 14 having a simple structure.

The configuration and operation of the electrical discharge machining apparatus including an electrode according to the first embodiment of the present invention is described below with reference to FIG. 3. The electrode 14 described above is mounted on a main shaft 16 of the electrical discharge machining apparatus, and the work 15 is placed in a working bath 17. In this case, when the area of the electrode 14 opposing the work 15 is small, the stray capacitance which contributes to machining is small. The preferable area of the electrode 14 opposing the work 15 varies depending on the distance between the electrode 14 and the work 15. Generally, it is preferably not less than 0.1 mm², and optimally not less than 1 mm². That is, when the thickness of the conductive layers is approximately 100 µm, the conductive layers opposing the work 15 optimally extend for not less than 10 mm.

The working bath 17 is filled with working fluid 18. A working current source 19 has a sufficient current supply capacity at a constant voltage, and is connected to the feed element 13 provided on the electrode 14 and to the work 15. A control device 20 controls the position of the electrode 14 via the main shaft 16 so that the gap between the electrode 14 and the work 15 is constant. The method may be a known method for controlling the position of the electrode by, for example, controlling the working current so as to be constant. That is, the position of the electrode 14 may be controlled so that the distance between the electrode 14 and the work 15 is decreased when the working current decreases below a predetermined value and is increased when the working current increases above the predetermined value, by measuring the current charging capacitors formed in the working gap by a current determining unit such as a Hall element or a current transformer, or by using the voltage value between terminals of a resistor shunted from the charging circuit. The current supplied by the working current source 19 charges the capacitors formed in the working gap between each conductive layer and the work 15 via the feed element 13 and the resistant element 12, and is used for machining through simultaneous and parallel electric discharges.

Although the working current source 19 applies a constant voltage according to the first embodiment, a current source which applies voltage in a pulsed form may be used, as in a case of a general electrical discharge machining apparatus or in the resistant electrode method. By a pulsed voltage, arc discharges can be suppressed. A working current source having a variable voltage may be advantageous in that machining at various levels of roughness is possible, and the current can be used for the control for avoiding abnormal electrical discharge.

According to the first embodiment, the position of the electrode 14 is controlled by measuring the current charging the capacitors. However, since the voltage value outputted from the working current source 19 is known, the current value for charging can be obtained by the potential difference between the feed element 13 and the work 15 by using resistors inserted in series in a charging circuit of the capacitors or using a working current source having a high output impedance. Therefore, the position of the electrode 14 may be controlled in accordance with the potential difference between the feed element 13 and the work 15 rather than measuring the charging current value. That is, a known controlling method may be used in which the distance between the electrode 14 and the work 15 is increased when the voltage between the electrode 14 and the work 15 decreases below a predetermined value, and the distance between the electrode 14 and the work 15 is decreased when the voltage between the electrode 14 and the work 15 increases above the predetermined value.

According to the first embodiment, the layered anisotropically conductive element 11 is formed with thin metallic plates coated with an insulative film. The low-conductive layers are not necessarily completely insulative, and they may be made of any electrically resistant material as long as the resistance value thereof is not less than 100Ω per layered thickness of 1 cm, which is sufficient to provide an effective potential difference between the laminated layers. With this arrangement, the layered anisotropically conductive element 11 has the same effects. In this case, the electrode can be made at low cost.

When the layered anisotropically conductive element 11 is made of an anisotropically conductive material, for example, a material including pyrolytic carbon, the electrode can be manufactured easily by using the anisotropic conductivity of the material. Pyrolytic carbon is a layered anisotropically conductive material including laminated carbon atoms, in which the conductivity parallel to the laminated faces is approximately 100 times that perpendicular thereto. When the feed element 13 is formed directly on an end face of a pyrolytic carbon member, which is the end face perpendicular to the laminated faces, the conductive layers therein are all charged at the same level of potential, whereby the member can be used as an electrode for general electrical discharge machining. When the feed element 13 is formed on the end face of the pyrolytic carbon member via a resistant element, the member can be used as an electrode with which parallel discharges can be generated according to the mechanism in the first embodiment described above.

Although, according to the first embodiment, the resistant element 12 and the feed element 13 are disposed at the upper face of the layered anisotropically conductive element 11, the resistant element 12 and the feed element 13 may be disposed on any of the layer-perpendicular end-faces 11c, for example, on the layer-perpendicular end-face 11c disposed at the side of the layered anisotropically conductive element 11.

In the first embodiment, the shape of the feed element 13 has not been described. The width of the feed element 13 opposing the conductive layers is set in proportion to the machined volume of work for each conductive layer per unit distance moved by the electrode in the machining direction, whereby the electrical discharge frequency can be increased because the charging resistance to the capacitors decreases in accordance with the machined volume of the work. Therefore, the electrical discharge frequency per unit machined-volume can be equalized, whereby electrical discharge at a high frequency concentrated in a limited region does not occur, thereby preventing the electrode from abnormally wearing out.

Figure 4:
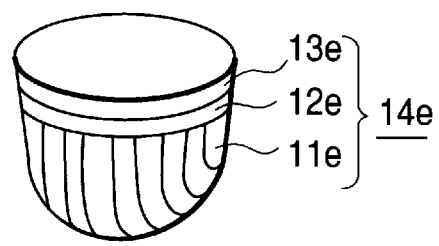
FIG. 4 is a perspective view of a modified example of the electrode for the electrical discharge machining apparatus according to the first embodiment of the present invention.

For example, when the direction of the machining path is vertical (downward), the width of the feed element 13 is increased at the region connected to the conductive layers of the electrode having a large vertically projected area. To this end, an electrode 14e, for example, shown in FIG. 4 is formed by depositing a resistant element 12e and a feed element 13e entirely on a layered anisotropically conductive element 11e. When the direction of the machining path is mainly horizontal, for example, in a reciprocating motion of the electrode in a finishing machining process, and when the projected area of each conductive layer disposed along the machining path is the same, the side members of the feed element 13 along the layered faces of the layered anisotropically conductive element 11 may be parallel to each other.

The electrode 14 for the electrical discharge machining apparatus according to the first embodiment of the present invention includes the layered anisotropically conductive element 11 in which conductive layers and low-conductive layers are alternately laminated on each other, the resistant element 12 connected to one of the layer-perpendicular end-faces 11c of the layered anisotropically conductive element 11, and the feed element 13 connected to the resistant element 12. With this arrangement, the area of each conductive layer as a capacitor opposing the work 15 can be increased, although the conductive layer is thin, by extending along the work surface. The capacitance formed at a working gap between the conductive layers and the work 15 equals the sum of the small capacitors connected in parallel to each other through resistors. Each capacitor having a capacitance sufficient for discharge machining is disposed at a distance sufficiently close to the others for generating a parallel discharge, whereby machining can be performed by simultaneous and parallel electrical discharges, thereby increasing the discharge machining speed by using an electrode having a simple structure.

The electrode can be manufactured at low cost when the low-conductive layers of the layered anisotropically conductive element 11 are electrically resistant elements.

The electrode can be manufactured easily when the layered anisotropically conductive element 11 is made of an anisotropic carbon.

The width of the feed element 13 opposing the conductive layers is set in proportion to the machined volume of work for each conductive layer per unit distance moved by the electrode in the machining direction, whereby the electrical discharge frequency can be increased in regions at which the machined volume of the work is large, thereby preventing the electrode from abnormally wearing out.

Second Preferred Embodiment

Figure 5:
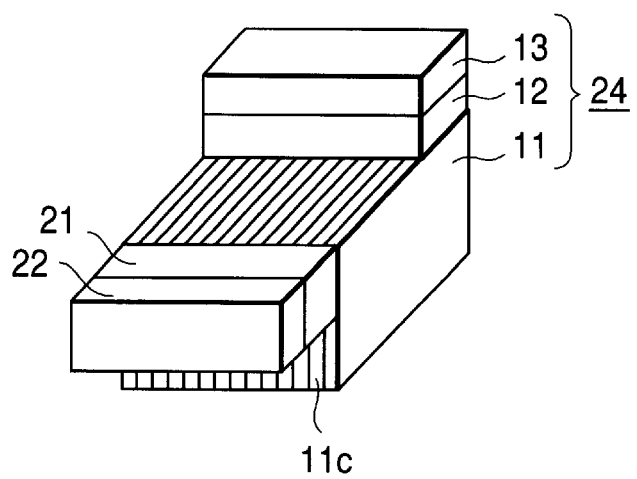
FIG. 5 is a perspective view of an electrode used in an electrical discharge machining apparatus according to a second embodiment of the present invention.
Figure 6:
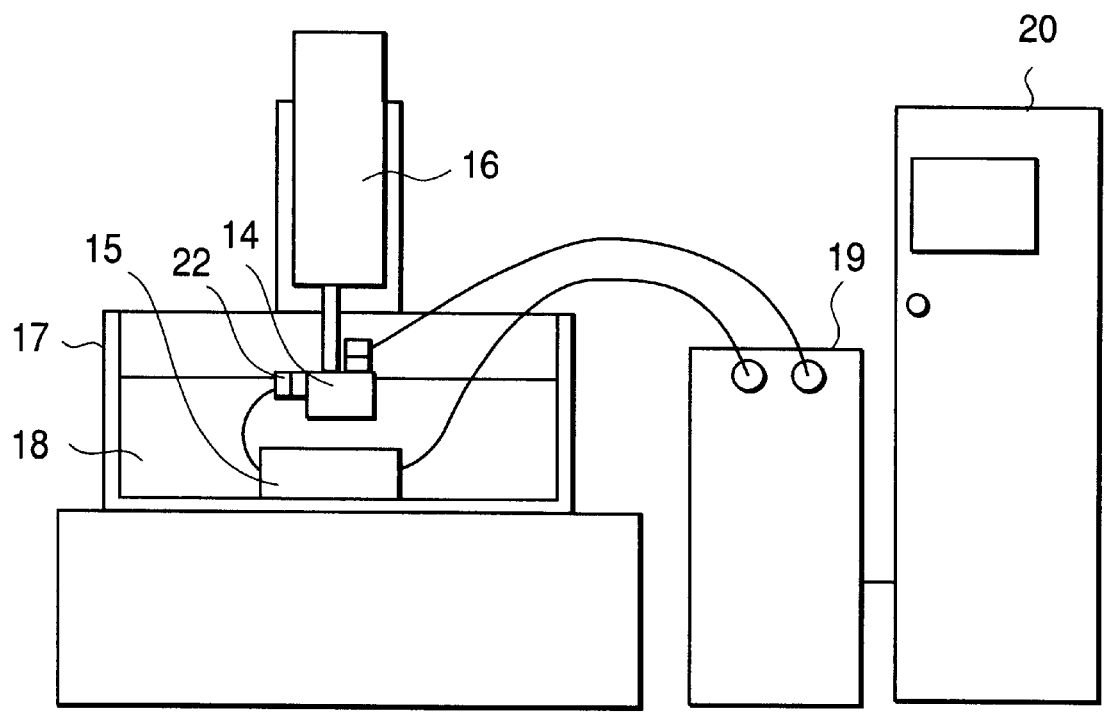
FIG. 6 is an illustration showing the configuration of the electrical discharge machining apparatus including the electrode shown in FIG. 5.

FIG. 5 is a perspective view of an electrode for an electrical discharge machining apparatus according to a second embodiment of the present invention. FIG. 6 is an illustration of the electrical discharge machining apparatus including the electrode for discharge machining shown in FIG. 5. In FIGS. 5 and 6, the same components or those having the same functions as those shown in FIGS. 1 to 3 are referred to with the same reference numerals, and a description of the same is omitted. An electrode 24 shown in FIG. 5 includes the layered anisotropically conductive element 11, the resistant element 12, the feed element 13, a dielectric element 21, and a grounding element 22. The dielectric element 21 is a dielectric member disposed on one of the layer-perpendicular end-faces 11c, formed with a thin film made of, for example, titanium oxide or barium titanate. The grounding element 22 is a conductive member bonded to or deposited on the dielectric element 21 in the same manner as the feed element 13.

The operation of the electrical discharge machining apparatus according to the second embodiment is described below. The electrical discharge machining apparatus according to the second embodiment differs from the electrical discharge machining apparatus according to the first embodiment in that the grounding element 22 is connected to the work 15 via a wire or the like. In the first embodiment, the machining is performed by using the stray capacitance formed between the conductive layers and the work 15 opposing each other across the working fluid 18. In contrast, according to the second embodiment, capacitance formed between the conductive layers and the grounding element 22 contributes to machining in addition to the stray capacitance formed between the conductive layers and the work 15. The dielectric element 21 disposed between the conductive layers and the grounding element 22 may be made of a material selected among various highly dielectric materials, such as barium titanate, whereby capacitance being several thousand times that which is formed by using a working fluid can easily be obtained.

A number of small slits may be formed on the layer-perpendicular end-faces 11c of the layered anisotropically conductive element 11, and the dielectric element 21 may be formed on any of these layer-perpendicular end-faces 11c provided with the small slits so as to greatly increase the area of the layer-perpendicular end-face 11c opposing the grounding element 22. With this arrangement, the capacitance can be increased greatly compared with that according to the first embodiment.

According to the second embodiment of the present invention, the conductive grounding element 22 is provided on the layer-perpendicular end-face 11c of the layered anisotropically conductive element 11 via the dielectric element 21, and the grounding element 22 is connected to the work 15, whereby the capacitance formed between the electrode 24 and the work 15 can be further increased compared with the case in the first embodiment. Therefore, the parallel discharge can be generated more positively, and the discharge-machining speed can be further increased by using the discharge-machining electrode having a simple structure.

Although the capacitance to be used for machining varies when the distance between the electrode 14 and the work 15 varies, according to the first embodiment, the capacitance formed between the grounding element 22 and the layer-perpendicular end-face 11c of the layered anisotropically conductive element 11, according to the second embodiment, is not affected by the working gap, whereby a machined surface having evenly low roughness is possible regardless of the area of the work 15 opposing the electrode 24.

Although the dielectric element 21 and the grounding element 22 are disposed on a side face of the electrode 24, according to the second embodiment, the dielectric element 21 and the grounding element 22 may be disposed on any layer-perpendicular end-face 11c, for example, on the layer-perpendicular end-face 11c disposed at the upper face of the layered anisotropically conductive element 11. The width of the feed element 13 opposing the conductive layers may be set in proportion to the machined volume of work for each conductive layer per unit distance moved by the electrode in the machining direction, as described with reference to FIG. 4 in the first embodiment.

Third Preferred Embodiment

Figure 7:
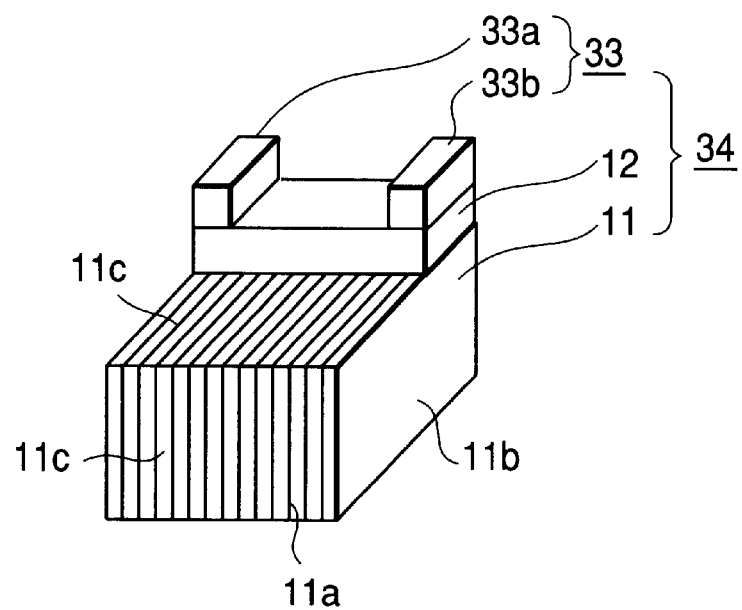
FIG. 7 is a perspective view of an electrode used in an electrical discharge machining apparatus according to a third embodiment of the present invention.
Figure 8:
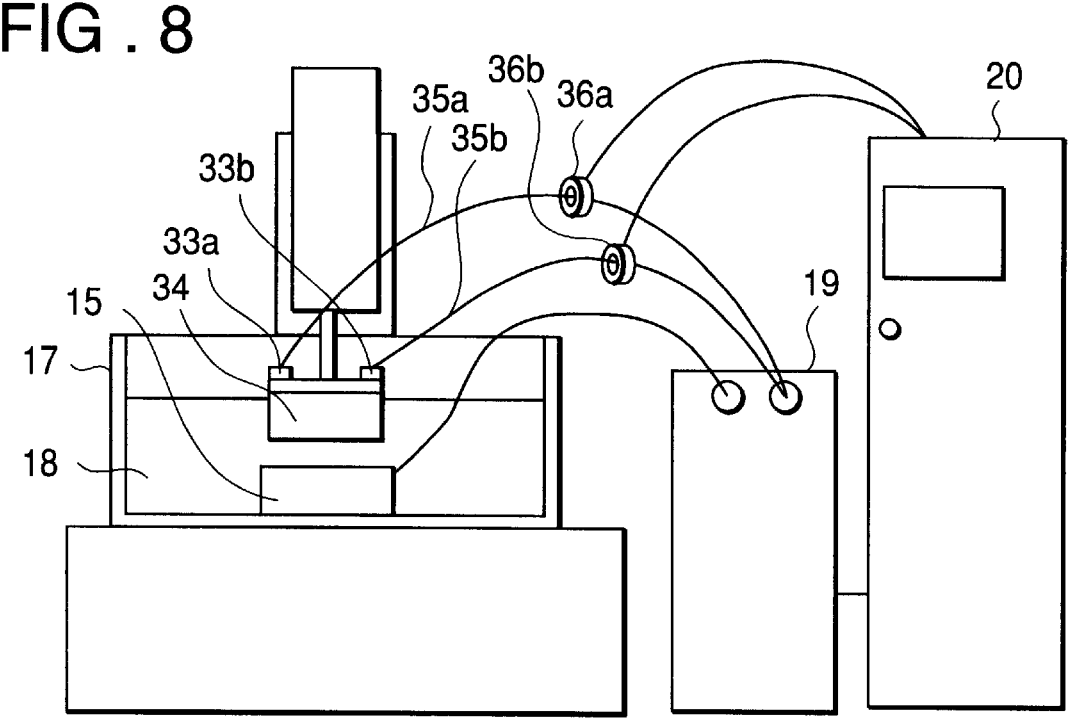
FIG. 8 is an illustration showing the configuration of the electrical discharge machining apparatus including the electrode shown in FIG. 7.

FIG. 7 is a perspective view of an electrode for an electrical discharge machining apparatus according to a third embodiment of the present invention. FIG. 8 is an illustration of the electrical discharge machining apparatus including the electrode shown in FIG. 7. In FIGS. 7 and 8, the same components or components having the same functions as those shown in FIGS. 1 to 3 are referred to with the same reference numerals and a description of those components is omitted. As shown in FIG. 7, the layered anisotropically conductive element 11, the resistant element 12, and a feed element 33 constitute an electrode 34. The feed element 33 includes a first feed element 33a and a second feed element 33b. The first and second feed elements 33a and 33b made of a conductive material such as copper are connected to the resistant element 12 by bonding thereto or are formed thereon by thin-film depositing at positions separated from each other in a direction perpendicular to the layer faces 11a of the layered anisotropically conductive element 11.

As shown in FIG. 8, the electrical discharge machining apparatus according to the third embodiment of the present invention differs from that in the first embodiment in that the first and second feed elements 33a and 33b are provided connected to a working current source 19 via feeding wires 35a and 35b, respectively, and the feeding wires 35a and 35b are provided with a first current determining unit 36a and a second current determining unit 36b, respectively, connected to a control device 20.

The electrical discharge machining apparatus according to the third embodiment operates as described below. The mechanism in which a parallel discharge is generated is the same as that described in the first embodiment, for which a description is omitted.

It is known that when a relatively highly electrically resistant material such as graphite is used for an electrode, the position in which discharge is generated can be specified by measuring the machining current at each of a plurality of feeding points.

The layered anisotropically conductive element 11 has low electrical resistance in a direction parallel to the layer faces 11a and very high electrical resistance in a direction perpendicular to the layer faces 11a. Therefore, charging current in a direction perpendicular to the layer faces 11a flows through the resistant element 12 instead of the layered anisotropically conductive element 11.

In the same manner as described above in the known case using a resistant material, for example, graphite for an electrode, by measuring the fed current flowing through the first and second feed elements 33a and 33b by using the first and second current determining units 36a and 36b, respectively, the specific capacitor which is being charged between the two feeding points can be detected. When it is determined from the outputs of the first and second current determining units 35a and 35b that the charging current is concentrated to the specific capacitor, it is considered that short-circuit occurs, and the electrode 34 can be controlled so as to move away from the word 15, thereby preventing the machining surface of the work 15 from being damaged. Other known controlling methods have been described in the first embodiment, such as for controlling the position of the electrode so that the working current value is made constant, and for controlling the position of the electrode in accordance with the potential difference between the feed element and the work.

Although the feed elements 33a and 33b are provided at two position, as described above, the feed elements may be provided at three or more positions.

According to the third embodiment of the present invention, at least two feed elements are connected to the resistant element at positions separated from each other in a direction perpendicular to the layer faces of the layered anisotropically conductive element 11, and at least two current determining units are provided for measuring current fed to the feed elements, thereby determining whether or not the charging current is concentrated to a specific capacitor, and thereby preventing the machining surface of the work from being damaged.

Fourth Preferred Embodiment

Figure 9:
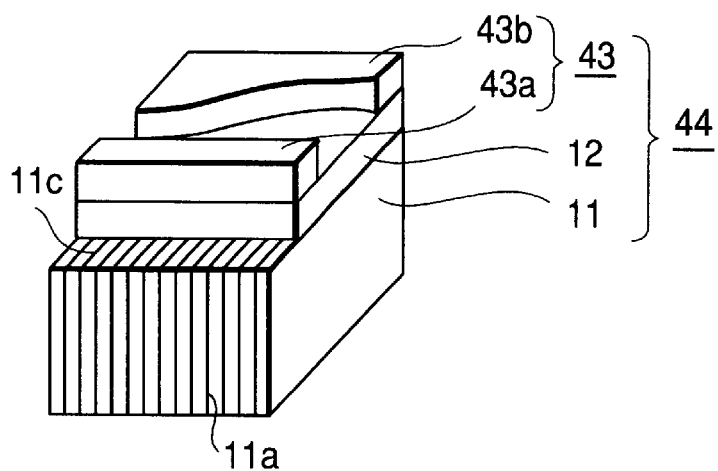
FIG. 9 is a perspective view of an electrode used in an electrical discharge machining apparatus according to a fourth embodiment of the present invention.
Figure 10:
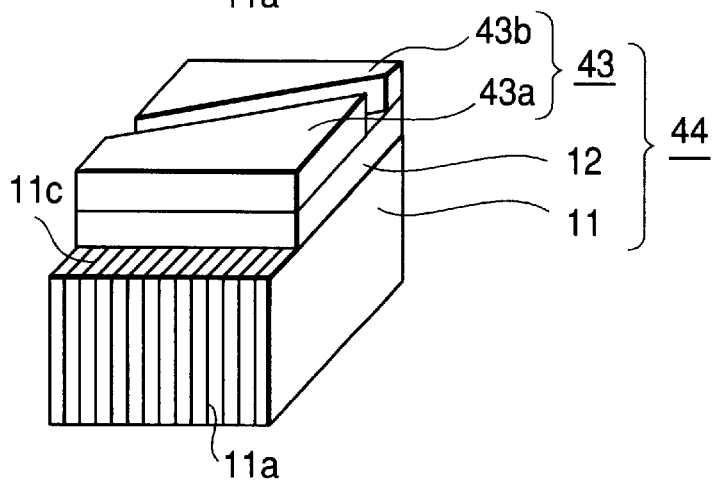
FIG. 10 is a perspective view of a modified example of the electrode for the electrical discharge machining apparatus according to the fourth embodiment of the present invention.

FIG. 9 is a perspective view of an electrode for an electrical discharge machining apparatus according to a fourth embodiment of the present invention. FIG. 10 is a perspective view of a modified example of the electrode for the electrical discharge machining apparatus according to the fourth embodiment of the present invention. In FIGS. 9 and 10, the same components or components having the same functions as those shown in FIG. 1 are referred to with the same reference numerals and a description of those components is omitted. As shown in FIGS. 9 and 10, the layered anisotropically conductive element 11, the resistant element 12, and a feed element 43 constitute an electrode 44. The feed element 43 made of a conductive material such as copper includes a first feed element 43a and a second feed element 43b.

The first and second feed elements 43a and 43b are disposed separated from each other along the layer faces 11a of the layered anisotropically conductive element 11. The difference in or the ratio of the opposing areas of each conductive layer of the layered anisotropically conductive element 11 and the feed element 43 between the feed elements 43a and 43b differs depending on the conductive layers. For example, the first feed element 43a is formed to have a width the same through in a direction perpendicular to the layer faces 11a, and the second feed element 43b is formed to have a width gradually increasing in a direction perpendicular to the layer faces 11a.

The configuration of the electrical discharge machining apparatus according to the fourth embodiment is the same as that in the third embodiment. That is, the first and second feed elements 43a and 43b are connected to the working current source 19 via the feed wires 35a and 35b, respectively. The feed wires 35a and 35b are provided with the first and second current determining units 36a and 36b, respectively, connected to the controlling device 20.

The electrical discharge machining apparatus according to the fourth embodiment operates as described below. The mechanism in which parallel discharge is generated is the same as the case in the first embodiment, for which a description is omitted. The current from the first and second feed elements 43a and 43b is supplied to each conductive layer in the thickness direction of the resistant element 12, according to the fourth embodiment. The charging resistance to the capacitors formed between the conductive layers and the work 15 is in inverse proportion to the opposing areas of the conductive layers and the first and second feed elements 43a and 43b.

The charging current to the capacitors is in inverse proportion to the charging resistance. Therefore, the charging current is in proportion to the opposing areas. Since the difference in or the ratio of the opposing areas of the conductive layers and the feed element 43 between the first and second feed elements 43a and 43b differs depending on the conductive layers provided with the feed elements 43a and 43b due to the shapes thereof, the difference in or the ratio of the charging current supplied by the first and second feed elements 43a and 43b differs between the conductive layers. Therefore, by measuring the charging current fed to the respective first and second feed elements 43a and 43b in the same manner as in the third embodiment, the capacitor being charged can be detected, thereby determining the specific capacitor to which the charging current is concentrated, and thereby preventing the machining surface of the work from being damaged.

The relationship of the difference in or the ratio of the opposing areas of the conductive layers and the feed element 43 between the first and second feed elements 43a and 43b with the position of each conductive layer has not been described in the fourth embodiment. When the difference in or the ratio of the opposing areas of the conductive layers and the feed element 43 between the first and second feed elements 43a and 43b increases or decreases in a direction perpendicular to the conductive layers, and when the difference or the ratio preferably varies linearly as shown in FIG. 10, the charging point can be specified by the outputs from the current determining units more easily.

Since the charging resistance, according to the fourth embodiment, is determined by the sum of the opposing areas of the conductive layers and the first and second feed elements 43a and 43b, the sum of the opposing areas corresponds to the opposing areas of the conductive layers and the feed element 13, according to the first embodiment. Therefore, when the width of the feed elements 43 opposing the conductive layers is set in proportion to the machined volume of work for each conductive layer per unit distance moved by the electrode in the machining direction, the discharge frequency can be increased at the position at which the machined volume is large, thereby preventing the electrode from abnormally wearing out.

Although the feed elements are provided at two positions in the fourth embodiment, the feed elements may be provided at three or more positions, so as to use, for example, two of them as needed.

According to the fourth embodiment, at least two feed elements are provided at positions separated from each other in a direction parallel to the layer faces 11a of the layered anisotropically conductive element 11. The feed elements 43a and 43b are connected to the resistant element 12 in a manner such that the difference in or the ratio of the opposing areas of the conductive layers of the layered anisotropically conductive element 11 and the feed elements between the feed elements 43a and 43b differs depending on the conductive layers. At least two current determining units are provided for measuring current fed to the respective feed elements, thereby determining whether or not the charging current is concentrated to a specific capacitor, and thereby preventing the machining surface of the work from being damaged.

The difference in or the ratio of the opposing areas of the conductive layers and the feed elements between the two feed elements varies linearly in a direction perpendicular to the conductive layers, whereby a charged point can be specified easily by the outputs from the current determining units.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. An electrical discharge machining apparatus comprising:
   a discharge-machining electrode opposing a workpiece across a working gap and including a layered anisotropically electrically conductive element including layers of a first material having a relatively high electrical conductivity and layers of a second material, different from the first material, and having a relatively low electrical conductivity, alternately laminated on each other;
   an electrically resistant element connected to an end surface of the layered anisotropically conductive element, the end surface being perpendicular to the layers of the first and second materials; and
   a feed element connected to the electrically resistant element.

2. The electrical discharge machining apparatus according to claim 1, wherein the second material is an insulator.

3. The electrical discharge machining apparatus according to claim 1, wherein the first material is electrically conductive.

4. The electrical discharge machining apparatus according to claim 1, wherein the feed element includes at least two feed devices connected to the electrically resistant element at respective positions separated from each other in a direction perpendicular to faces of the layers of the layered anisotropically electrically conductive element, and current determining means for measuring electric current fed to the individual feed devices.

5. The electrical discharge machining apparatus according to claim 1, comprising an electrically conductive grounding element provided via a dielectric element on end surfaces of the layered anisotropically electrically conductive element, the electrically conductive grounding element being connected to the workpiece.

6. The electrical discharge machining apparatus according to claim 5, wherein the second material is an insulator.

7. The electrical discharge machining apparatus according to claim 5, wherein the first material is electrically conductive.

8. The electrical discharge machining apparatus according to claim 1, wherein the feed element includes at least two feed devices connected to the electrically resistant element at respective positions separated from each other in a direction parallel to faces of the layers of the layered anisotropically electrically conductive element, manner so that one of difference between and ratio of opposing areas of the electrically conductive layers of the layered anisotropically electrically conductive element and the feed element differs depending on individual electrically conductive layers, the feed element including current determining means for measuring electric current fed to the individual feed devices.

9. The electrical discharge machining apparatus according to claim 8, wherein the feed element has a width opposing the electrically conductive layers set in proportion to machined volume of the workpiece for each electrically conductive layer per unit distance moved by the electrode in a machining direction.

10. The electrical discharge machining apparatus according to claim 8, wherein one of the (i) difference between and (ii) ratio of the opposing areas of the electrically conductive layers of the layered anisotropically electrically conductive element and the feed element, between the feed devices, varies linearly with respect to position of individual electrically conductive layers.

11. The electrical discharge machining apparatus according to claim 1, wherein the first material is copper and the second material is chosen from the group consisting of alumina and an enamel.

12. The electrical discharge machining apparatus according to claim 1, wherein the layers of the first and second materials are bonded to each other.

13. The electrical discharge machining apparatus according to claim 1, wherein the layers of the first material have a thickness not larger than 1 mm.

14. The electrical discharge machining apparatus according to claim 1, wherein the electrically resistant element has an electrical resistance within a range from 10 ohms to 10 kilohms.

15. The electrical discharge machining apparatus according to claim 1, wherein the alternately laminated layers of first and second materials are bonded to each other.

* * * * *